United States Patent
Kaduluri et al.

(10) Patent No.: US 10,642,859 B2
(45) Date of Patent: May 5, 2020

(54) DATABASE REPORT OFFLOAD SERVER

(71) Applicant: Dell Products, LP, Round Rock, TX (US)

(72) Inventors: Srinivasa Reddy Kaduluri, Bangalore (IN); Prabhat Kumar Patel, Sundergarh (IN)

(73) Assignee: Dell Products, L.P., Round Rock, TX (US)

( * ) Notice: Subject to any disclaimer, the term of this patent is extended or adjusted under 35 U.S.C. 154(b) by 679 days.

(21) Appl. No.: 15/007,695

(22) Filed: Jan. 27, 2016

(65) Prior Publication Data
US 2017/0213046 A1 Jul. 27, 2017

(51) Int. Cl.
*G06F 16/00* (2019.01)
*G06F 7/00* (2006.01)
*G06F 16/27* (2019.01)

(52) U.S. Cl.
CPC ................... *G06F 16/27* (2019.01)

(58) Field of Classification Search
CPC .. G06F 17/30; G06F 21/6218; G06F 21/6227; G06F 21/2141; G06F 21/604
USPC ........................................................ 707/783
See application file for complete search history.

(56) References Cited

U.S. PATENT DOCUMENTS

| | | | |
|---|---|---|---|
| 6,012,067 A * | 1/2000 | Sarkar | G06F 16/252 |
| 9,031,980 B2 | 5/2015 | Haber | |
| 9,984,140 B1 * | 5/2018 | Sukumaran | G06F 16/219 |
| 2006/0129559 A1 | 6/2006 | Sankaran et al. | |
| 2007/0130154 A1 * | 6/2007 | Venkatesan | G06F 16/285 |
| 2007/0203944 A1 * | 8/2007 | Batra | G06F 16/27 |
| 2009/0183152 A1 | 7/2009 | Yang et al. | |
| 2009/0198945 A1 | 8/2009 | Sekhar | |
| 2011/0119251 A1 | 5/2011 | Yu | |
| 2011/0321041 A1 * | 12/2011 | Bhat | G06F 9/4856 718/1 |
| 2015/0143162 A1 * | 5/2015 | Wang | G06F 11/2025 714/4.11 |
| 2015/0193620 A1 | 7/2015 | Khatri et al. | |
| 2016/0292167 A1 * | 10/2016 | Tran | G06F 16/24542 |

* cited by examiner

*Primary Examiner* — Usmaan Saeed
*Assistant Examiner* — Raquel Perez-Arroyo
(74) *Attorney, Agent, or Firm* — Larson Newman, LLP

(57) ABSTRACT

An information handling system includes a first database and a second database. A server submits a request received by the first database instead to the second database by 1) establishing a service to the second database, the service having write privileges, 2) establishing a service user account that includes the write privilege, and 3) editing the request to include a link to the second database.

18 Claims, 5 Drawing Sheets

DATABASE REPORT OFFLOAD SERVER

FIELD OF THE DISCLOSURE

The present disclosure generally relates to information handling systems, and more particularly relates to database report offload servers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

A database system normally includes an organization of collected data, referred to as the database, and an associated package of programs referred to as the database management system (DBMS) for creating, maintaining, manipulating, and using the database. The performance, availability and throughput of the database system can depend on the nature of queries submitted to the database.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
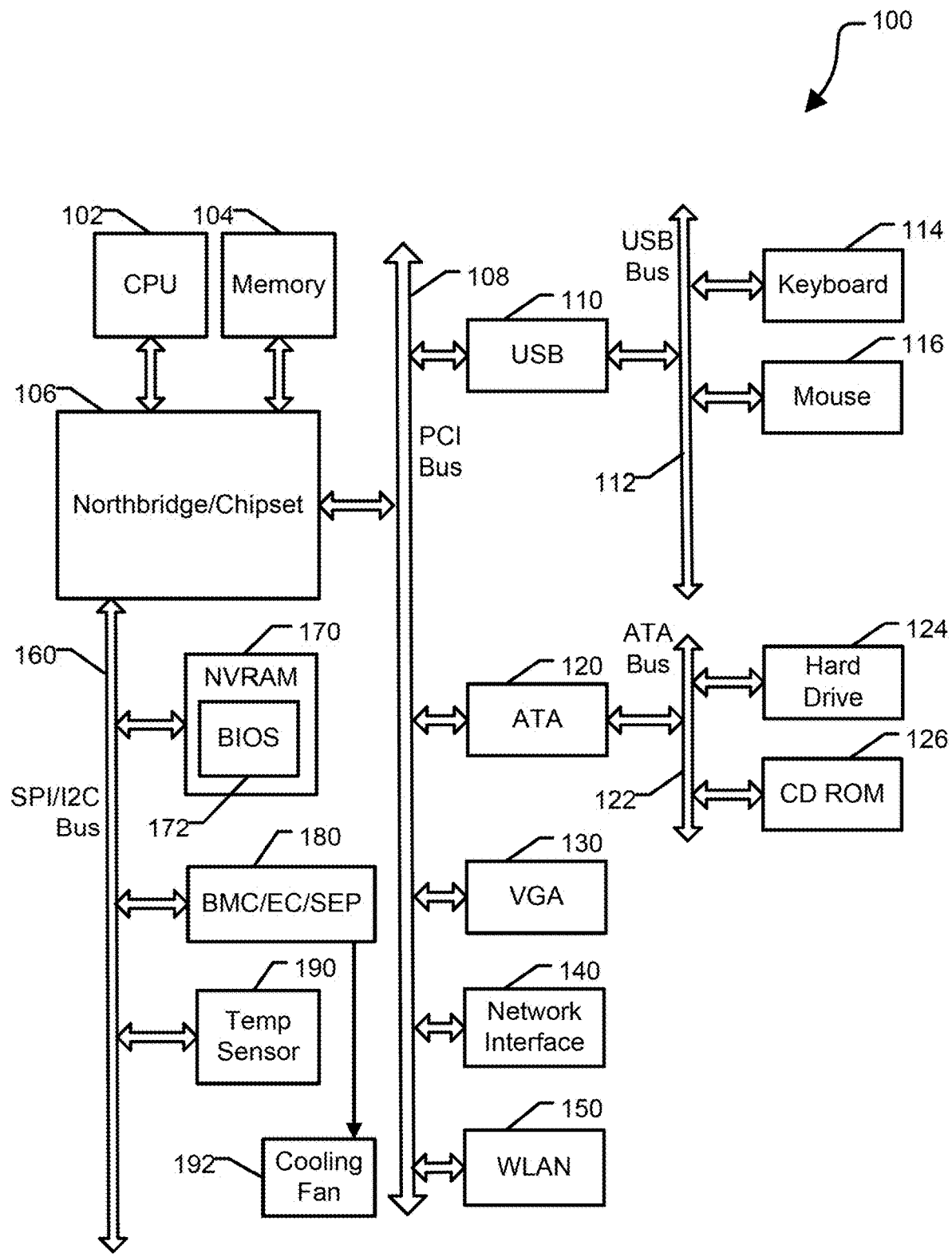
FIG. 1 is a block diagram illustrating an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, a baseboard management controller (BMC) 180, temperature sensor 190 and a cooling fan 192.

BMC 180 can be referred to as a service processor, embedded controller (EC), a storage enclosure processor (SEP), and the like. Capabilities and functions provided by BMC 180 can vary considerably based on the type of information handling system. For example, the term baseboard management system is often used to describe an embedded processor included at a server, an embedded controller is more likely to be found in a consumer-level device, and a storage enclosure processor is usually associated with a data storage system. As disclosed herein, BMC 180 represents a processing device different from CPU 102, which provides various management functions for information handling system 100. For example, BMC 180 may be responsible for power management, cooling management, a remote configuration interface to system 100, and the like. System 100 can include multiple temperature sensors for monitoring operating temperature of components included at system 100, such as CPU 102, VGA 130, and hard drive 124.

System 100 can include additional processors (not shown at FIG. 1) that are configured to provide localized or specific control functions, such as a battery management controller. Bus 160 can include one or more busses, including an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Figure 2:
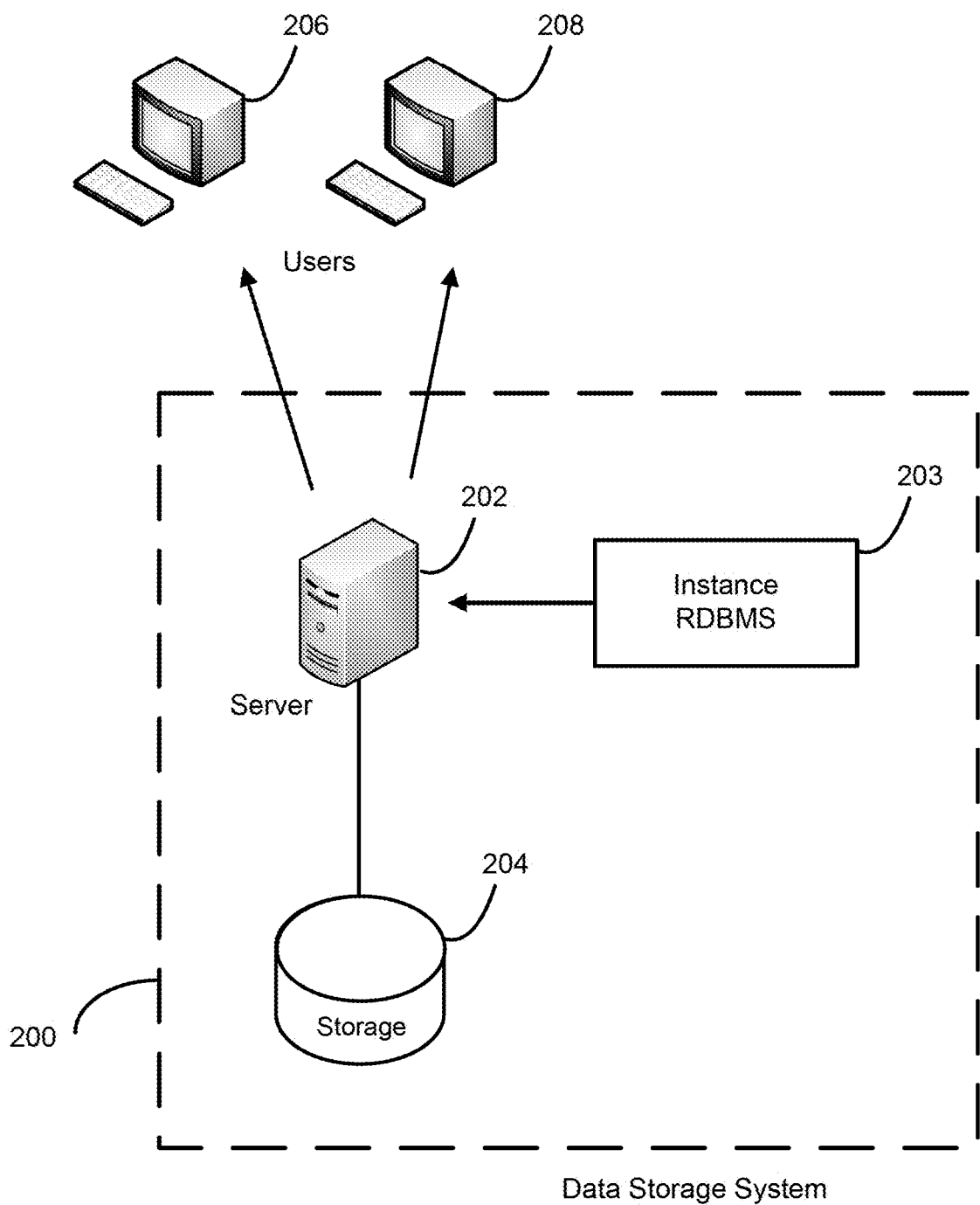
FIG. 2 is a block diagram of a data storage system.

FIG. 2 shows a data storage system 200 including a server 202 having a relational database 204. The server 202 may contain an instance of a relational database management system (RDBMS) 203. The instance 203 may store instance specific information, and background and foreground processes. Those processes may communicate with users 206 and 208, accept requests from the users, and take actions on the database in the storage 204. There may be a wide range of actions, such as to retrieve data that meets certain characteristics, and associate it with other data. In a particular embodiment, the server 202 forms part of a database front end that enables database services for a particular enterprise or group of enterprises, such that database 204 provides logically grouped data that is accessible to users. As such, the database front end can represent various operational capabilities for an enterprise such as an airline or hotel reservation system, a manufacturing production system, a banking system, another enterprise system, or a combination thereof. For example where the database front end represents an airline reservation system, the database 204 can represent a flight schedule database and other databases (not shown) can represent a flight pricing database and a passenger reservation database. The user can request a flight reservation through a web interface, a customer service call center, or the like. The request can be sent to proxy server that can provide one or more queries to the databases, receive responses to the queries, and provide a reservation to the user based upon the available flight schedules, pricing, and seat availability, as provided by the databases.

The database 204 may be a mass storage device that has storage space for large amounts of data, and may hold a collection of related records or database. In a particular embodiment, the database 204 represents one or more commercial database systems that can provide query responses in a standard format, such as a structured query language (SQL), an application programming interface (API), a graphical user interface (GUI), or another standard format. As such, server 202 can receive requests from users and coordinate queries in one or more of the databases in order to satisfy the request. Thus, the databases 204 can format the data residing in the databases in accordance with the associated RDBMS. An example RDBMS includes Microsoft Access, Microsoft SQL Server, MySQL, Oracle, SQLite, Sybase SQL, or another DBMS as needed or desired.

Figure 3:
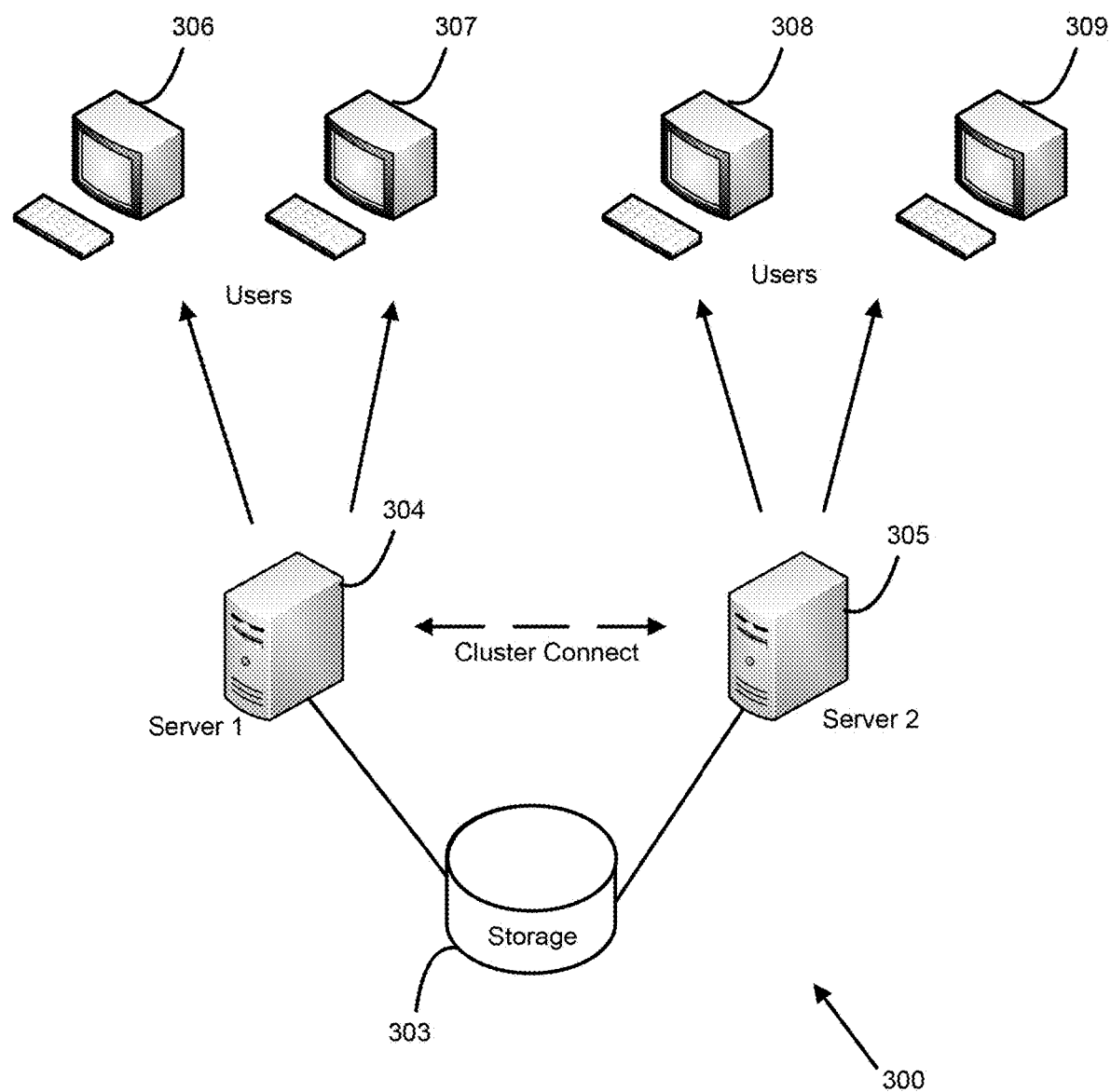
FIG. 3 is a block diagram of a clustered data storage system.

FIG. 3 shows another data storage system 300 having a relational database 303 and servers 304 and server 305, each of which can access the database 303. Each server may contain an instance of an RDBMS (not shown). The servers 304 and 305 communicate with each other to form a cluster, and each server may have its own group of users. Thus, server 304 communicates with users 306 and 307, and server 305 has users 308 and 309. Each server may work independently with its own instance.

Figure 4:
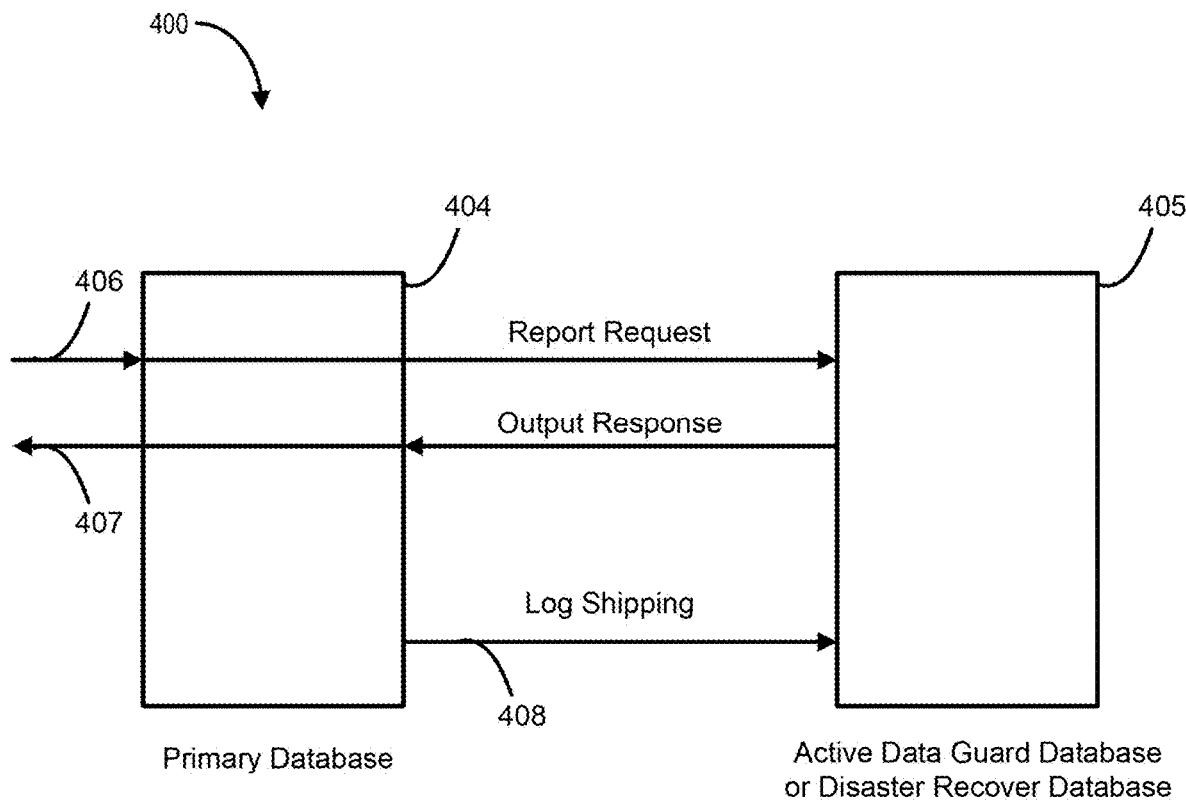
FIG. 4 is a block diagram showing a primary storage system and a disaster recovery storage system.

Either database 204 or database 303 can have a backup. FIG. 4 shows a system 400 having a primary database 404 and a backup database 405. If for some reason the primary database system becomes unavailable, the backup database 405 (also known as a disaster recovery database or as an active data guard database) may take over and perform the duties of the primary system until the primary system is again available. To accomplish this, the backup system normally maintains a current copy of the database. As the primary database undergoes changes, a log shipping process 408 periodically sends update information to the backup database. Normally this is the only circumstance under which data can be written to the backup database, which is otherwise maintained in a read-only state.

Data in the databases is often arranged in arrays called tables. For example, a table of employee information named EMP may have fields for employee name, employee number, sex, date of hire, name of supervisor, health plan, and other information. A user may use software tools, such as Business Intelligence Publisher, to help author queries or report requests. A data retrieval request may be directed to the table EMP, and may contain commands that ask a question such as "For those employees who are male, how does date of hire correlate with health plan?"

The commands may be written in a computer language such as dBase, SQL or SPARQL. Reports that are normally run on the primary database may under certain circumstances be run on the backup database. Thus a request 406 received by the primary database 404 may be altered and then submitted to the backup system 405. The alteration may be done by manually editing a file, or it may be done automatically by a script or computer program.

The backup system 405, which normally may not be queried, may be accessed by first setting up a database service to the backup system. For example, Oracle Database Service Account is a login account used to connect a database having some extra privileges. A service user account then may be established to gain the privilege to use the backup system.

Next, a database link may be set up. The database link is an object on the primary database system 404 that points to the backup database system 405. Commands to the relational database system may be changed to refer to the database link. In a SQL based system for example, an original command "SELECT EMPNO FROM EMP" is changed to "SELECT EMPNO FROM EMP@DBLINK". The @DBLINK redirects the command to the backup system 405. Each reference to a table name is also preferably changed by appending the same suffix, so that "table_name" becomes "table_name@DBLINK." As mentioned, these changes may be made manually using a text editor, or by more automatic programming.

An output response 407 from the backup system 405 is written into the primary system 404. Any metadata logging that is required by a report or program can continue to run in the primary system. The backup system 405 may still perform its disaster recovery standby role while it is executing the report request.

Figure 5:
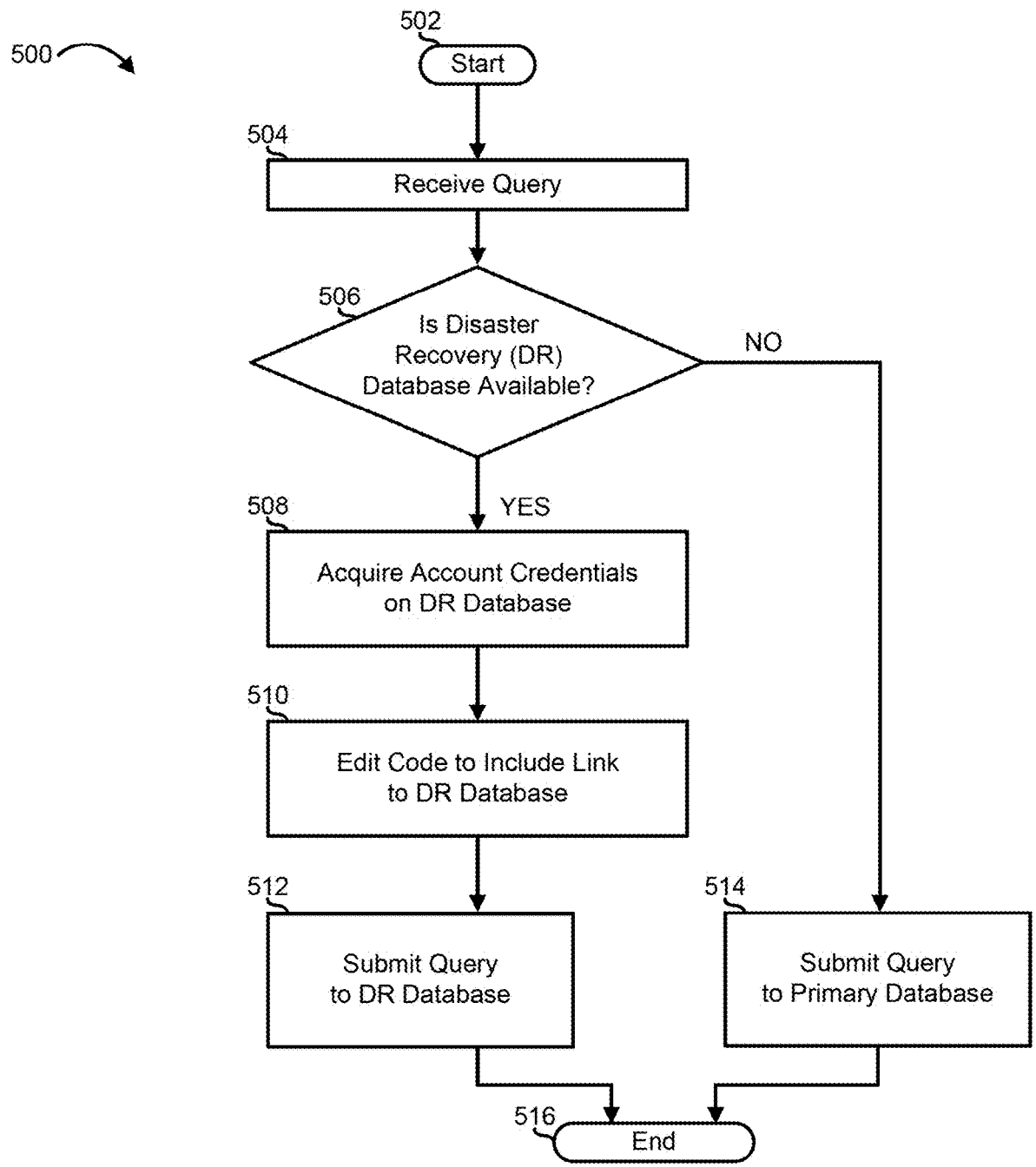
FIG. 5 is flow chart of a method to produce a database report.

FIG. 5 shows a method 500 in accordance with one embodiment of this disclosure. The method starts at step 502, and at step 504 a data storage system receives a query. At step 506 a decision is made. If there is no disaster recovery database system available, the flow branches to step 514. At step 514 the query is submitted to the primary data storage system, and the method ends step 516. If a disaster recovery database system is available, the flow branches to step 508. At step 508 the method acquires credentials to allow it to access the backup database. As discussed above, those credentials may include database service, service user account, and database link. Step 510 edits the code in the retrieval request. Step 510 may append "@DBLINK" to each reference of each table, thereby referring to the table in the BACKUP system. At step 512 the newly edited retrieval request may be submitted. The method ends at step 516.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a first data storage system, wherein the first data storage system includes a first database;
    a second data storage system, wherein the second data storage system includes a second database, wherein the second database is normally a read only disaster recovery database;
    a server including a hardware processor to submit a report request received by the first database to determine whether the second database is available to process the report request while performing a disaster recovery role, and to redirect the report request to the second database if the second database is available to process the report request by 1) establishing a service to the second database, the service having write privileges, 2) establishing a service user account that includes the write privileges, and 3) editing commands in the report request to include a link to the second database, wherein the editing the commands includes updating table names in the report request to refer to table names at the second database;
    if the report request is redirected to the second database, then the second database to process the report request while performing the disaster recovery role else the first database to process the report request; and
    the first data storage system to receive a response from the second database and to log metadata for the report request while the second database is processing the report request.

2. The information handling system of claim 1, wherein the first database is a relational database.

3. The information handling system of claim 1, wherein the second database is a relational database.

4. The information handling system of claim 1, wherein the first data storage system or the second data storage system or both have more than one server accessing their respective databases.

5. The information handling system of claim 1, wherein the response to the report request is transmitted to the first database.

6. The information handling system of claim 1, wherein the link is included automatically.

7. A method comprising:
    receiving a report request intended for a first database, wherein the first database is included in a first data storage system;
    establishing a service having write privileges to a second database that is normally a read only disaster recovery database, wherein the second database is included in a second data storage system;
    determining whether the second database is available to process the report request while performing a disaster recovery role;
    in response to the determining that the second database is available to process the report request:
        establishing a service user account that includes the write privileges;
        editing commands in the report request to include a link to the second database, wherein the editing the commands includes updating table names in the report request to refer to table names at the second database; and
        submitting the report request to the second database;
    if the report request is redirected to the second database, then processing the report request by the second database while performing the disaster recovery role else the first database to process the report request; and
    logging metadata for the report request by the first data storage system during the processing of the report request by the second database.

8. The method of claim 7, wherein the first database is a relational database.

9. The method of claim 7, wherein the second database is a relational database.

10. The method of claim 7, wherein the link is appended to the report request.

11. The method of claim 10, wherein the link is appended manually.

12. The method of claim 7, wherein the link is appended automatically.

13. A system comprising:
    a server; and
    a non-transitory medium storing instructions that, when executed by the server, perform a method including
        receiving a report request intended for a first database, wherein the first database is included in a first data storage system, establishing a service having write privileges to a second database that is normally a read only disaster recovery database, wherein the second database is included in a second data storage system, determining whether the second database is available to process the report request while performing a disaster recovery role, in response to the determining that the second database is available to process the report request: establishing a service user account that includes the write privileges, editing commands in the report request to include a link to the second database, wherein the editing the commands includes updating table names in the report request to refer to table names at the second database, and submitting the report request to the second database, if the report request is redirected to the second database, then processing the report request by the second database while performing the disaster recovery role else processing the report request by the first database, and logging metadata for the report request by the first data storage system during the processing of the report request by the second database.

14. The system of claim 13, wherein the first database is a relational database.

15. The system of claim 13, wherein the second database is a relational database.

16. The system of claim 13, wherein the link is appended to the report request.

17. The system of claim 16, wherein the link is appended manually.

18. The system of claim 13, wherein the link is appended automatically.

\* \* \* \* \*